United States Patent
Twomey (10) Patent No.: US 11,571,629 B2
(45) Date of Patent: Feb. 7, 2023

(54) SYSTEM AND SOFTWARE FOR CHALLENGE-BASED MATCHMAKING

(71) Applicant: Mark Twomey, Mesquite, TX (US)

(72) Inventor: Mark Twomey, Mesquite, TX (US)

(*) Notice: Subject to any disclaimer, the term of this patent is extended or adjusted under 35 U.S.C. 154(b) by 0 days.

(21) Appl. No.: 16/986,794

(22) Filed: Aug. 6, 2020

(65) Prior Publication Data

US 2021/0038997 A1 Feb. 11, 2021

Related U.S. Application Data

(60) Provisional application No. 62/884,678, filed on Aug. 9, 2019.

(51) Int. Cl.
*A63F 13/795* (2014.01)
*A63F 13/35* (2014.01)

(52) U.S. Cl.
CPC ........ *A63F 13/795* (2014.09); *A63F 13/35* (2014.09)

(58) Field of Classification Search
CPC ...... A63F 13/795; A63F 13/798; A63F 13/35; A63F 13/352
USPC .......................................................... 463/42
See application file for complete search history.

(56) References Cited

U.S. PATENT DOCUMENTS

| | | | |
|---|---|---|---|
| 8,753,213 B1* | 6/2014 | Lawson | G07F 17/3276 463/42 |
| 9,760,955 B2* | 9/2017 | Soni | G06F 16/70 |
| 2012/0142429 A1* | 6/2012 | Muller | A63F 13/35 463/42 |
| 2020/0143197 A1* | 5/2020 | Zmijewski | A63F 13/5252 |
| 2020/0376389 A1* | 12/2020 | Rice | A63F 13/795 |

OTHER PUBLICATIONS

In Mortal Kombat (2011), https://mortalkombat.fandom.com/wiki/King_of_the_Hill (Year: 2011).*

* cited by examiner

*Primary Examiner* — Michael A Cuff
(74) *Attorney, Agent, or Firm* — Norton Rose Fulbright US LLP (57) ABSTRACT

The present invention is directed to systems, methods, and computer-readable instructions for managing a challenge-based matchmaking session comprising a plurality of sequential video game matches between two or more players pursuant to rules set by a host. Players participating in the session may submit challenges (e.g., performance ratings, monetary value, etc.), and the players are sorted into a ranked queue based on their respective challenges. The ranked queue is preferably re-sorted in response to challenge submissions, revisions, or withdrawals. For each match of the matchmaking session, at least two players are selected from the ranked queue and a match is initialized between the players. At the end of each match, one player is designated as a winner and the other designated as a loser, and portions of the challenge received from each losing player is allocated for distribution (e.g., transfer, deposit, etc.) to an account corresponding to each winning player.

20 Claims, 5 Drawing Sheets

FIG. 3

# SYSTEM AND SOFTWARE FOR CHALLENGE-BASED MATCHMAKING

CROSS-REFERENCE TO RELATED APPLICATION

This application claims the benefit of U.S. Provisional Patent Application No. 62/884,678, entitled "Challenge format competition administration software," filed on Aug. 9, 2019, which is expressly incorporated by reference herein in its entirety.

TECHNICAL FIELD

Aspects of the disclosure relate to computer systems, computer software, and video games. Specifically, aspects of the disclosure relate to video game software, administering online games, and challenge-based matchmaking.

BACKGROUND OF THE INVENTION

Competitive video games allow players to test their skill, strategy, knowledge, and play-styles against others. Such games may provide one-on-one competition (e.g., Street Fighter™, Starcraft™, Hearthstone™, etc.). Other games allow teams of players to test their mettle against others (e.g., League of Legends™, Counter-Strike™, etc.) or provide both modes of competition (e.g., Fortnite™, Apex Legends™, etc.). Players are given opportunities to outthink, overpower, and outplay one another until one wins and one loses. Many of these games allow players to queue for online matchmaking over the Internet, providing players with opportunities to test their skill against others with regard to physical distance.

Once a niche hobby in arcades and homes, competitive video games are an ever-growing industry—i.e., electronic sports (e.g., "Esports"). Each year, regional, national, and international tournaments (e.g., EVO™, Dreamhack™, etc.) are organized to determine the best player for a specific game, often with multi-million-dollar monetary prizes and bragging rights at stake. Beyond the participating players, these events draw in millions of world-wide spectators who are excited and eager to cheer on their favorite players and find out who is the best. With such sizeable viewership numbers, Esports also bring in sizable advertising revenues. Thus, there is a critical need to provide mechanisms for competitive matchmaking to determine the most skilled player(s) for a particular game.

Conventional matchmaking systems may be time-based, rating-based, or seed-based. Time-based matchmaking requires players to be queuing for matches at or around the same time. These systems are therefore based on availability; but there are no guarantees that players who are matched together have proportionate skills. Rating-based systems, on the other hand, utilize mathematical representations of a player's skill and match players together based on the relative proximity of their respective ratings. Examples of ratings-based systems include an Elo rating system or TrueSkill™. Typically, mathematical algorithms are used to calculate a player's rating based on the player's past performance, adjusting upward for wins and downward for losses. However, these systems are susceptible to manipulation by, for example, intentional losses, intentional win-trading, or repeated creation of accounts with minimal performance history.

Seed-based matchmaking is another system typically used to create multi-stage, tournament brackets, with multiple players pre-arranged into successive brackets in a manner that is typically intended so that the supposedly best players do not meet until later in the competition. Players may be "seeded" or planted into individual, head-to-head brackets or pools based on skilled, usually based on their respective performance ratings or subject determinations by a tournament organizer. High-skilled players are typically distributed across the initial brackets or groups to ensure that no single group is unusually competitive due to a greater presence of strong competitors, often known as a "group of death." The players then participate in successive match-ups, eliminating losing players from the tournament and culminating in quarterfinals, semi-finals, and finals. However, such intentional player distribution makes seed-based matchmaking artificial constructs, as highly-skilled players in separate brackets may never be matched together if one player is eliminated early due to random chance. Efforts to remedy this issue include double-elimination brackets, but such solutions become untenable as the number of participating players increases because of the additional time required to manage and implement two separate brackets. Additionally, seed-based matchmaking is not conducive to ad-hoc matchmaking, as brackets are typically planned prior to the start of a tournament. Moreover, any ad-hoc insertion of brackets for late-comers risk creating the aforementioned group of death. Accordingly, there is a need for an interactive, matchmaking system that provides for ad-hoc matchmaking and improved skill-based competition.

BRIEF SUMMARY OF THE INVENTION

The present invention is directed to systems, methods, and computer-readable instructions for managing a challenge-based matchmaking session. According to embodiments, a matchmaking session may include a plurality of sequential matches corresponding to a video game between two or more players. In some embodiments, a matchmaking session may include two or more sub-sessions, each comprising a plurality of sequential matches. The session is preferably managed pursuant to rules set by a host. The rules may include, for example, gameplay-specific rules (e.g., banning specific characters, maps, third-party assistance tools; setting the duration or structure of each match, setting the occurrence and duration of time periods for accepting challenges, setting a predetermined number of matches for the matchmaking session, etc.) or matchmaking-specific rules (e.g., types and scope of challenges on which matchmaking will be based, intervals between matches in a session, sorting of session queues, etc.).

According to embodiments, a plurality of players may join the matchmaking session as participants or spectators. Preferably, the host and the plurality of players create registered accounts that include information such as, for example, user name, performance rating associated with the account, an amount of money available to the account, and information about the events that the host or user has administered or participated in, respectively. Participating players may submit challenges and are accordingly sorted into a ranked queue based on their challenges. For example, players may be organized in a descending order corresponding to a performance rating and/or monetary value included in their respective challenges. Challenges of embodiments may be submitted, revised, or withdrawn by the players pursuant to rules set by the host, and the ranked queue is preferably re-sorted in response to such challenge submissions, revisions, or withdrawals.

For each match of the matchmaking session, at least two players are selected from the ranked queue and a match is initialized between the players. For example, in a first match of the session, both players are designated as challengers at the beginning of the match, and at the end of the match, one player is designated as a winner and the other designated as a loser. The challenges received from each match participant are preferably validated to confirm that the challenges are supported by the player's account. For example, if the rating value included in a challenge received from a player selected as a challenger for a match of the session exceeds the player's performance rating, the challenge is invalid and another player may be selected from the ranked queue as a replacement challenger. For subsequent matches of the session, a new challenger is selected from the ranked queue, and a match is initialized between the new challenger and the winner of the preceding match. According to embodiments, at the end of each match, portions of the challenge received from each losing player are allocated for distribution (e.g., transfer, deposit, etc.) at least to an account corresponding to each winning player. For example, a first portion of a losing player's challenge may be allocated to the winning player of a particular match, a second portion may be allocated for a subsequent player who defeats the winning player of the particular match, a third portion may be allocated for a winning player of a final match of the session, a fourth portion may be allocated to the host administering the matchmaking session, and a fifth portion may be allocated to the server facilitating the matchmaking session, or combinations thereof.

By dynamically receiving challenges from and ranking participating players throughout the duration of the matchmaking session, the embodiments herein allow for dynamic matchmaking to facilitate skill-based competitions. Additionally, challenges described herein allow players a greater degree of control over the matchmaking process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
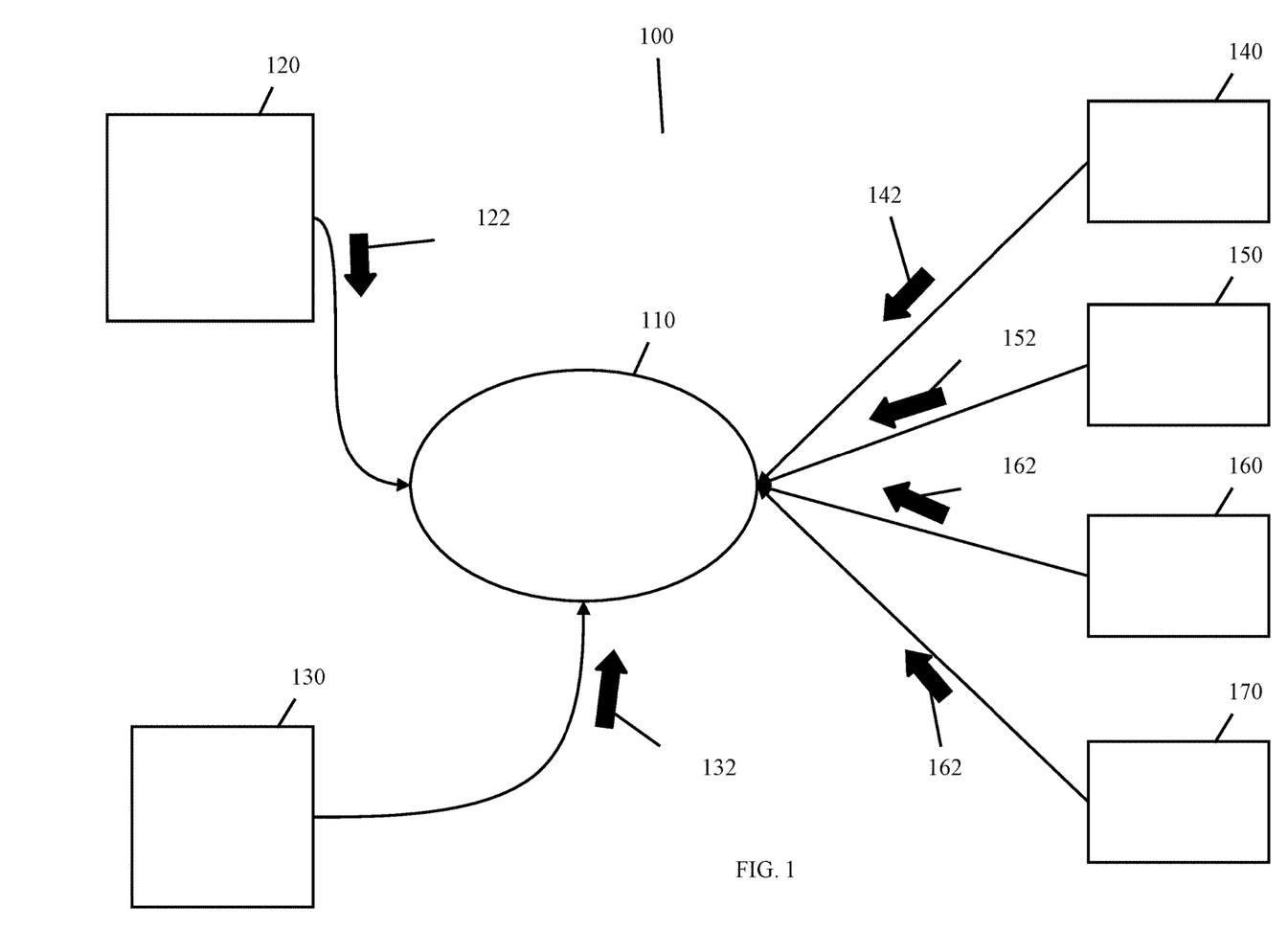
FIG. 1 illustrates a block diagram of a system for challenge-based matchmaking in accordance with embodiments of the present invention.

Referring to FIG. 1, an embodiment of a system for challenge-based matchmaking is shown as system 100. As shown in FIG. 1, system 100 includes data network 110, server 120, host device 130, and player devices 140, 150, 160, and 170. In operation according to embodiments herein, system 100 may be used to administer and track challenge-based competition events. Player devices 140, 150, 160, and 170 of embodiments may each be communicatively coupled with host device 130 via network 110. Host device 130 is preferably communicatively coupled with server 120 via network 110, and in some embodiments, player devices 140, 150, 160, and 170 may also be communicatively coupled with server 120 via network 110. Additionally, player devices 140, 150, 160, and 170 may be communicatively coupled with each other via network 110 to facilitate operations discussed below (e.g., gameplay, messaging, spectating, etc.).

According to embodiments, data network 110 includes one or more communication networks for facilitating communication among server 120, host device 130, and player devices 140, 150, 160, and 170. Network 110 may include wired networks, wireless networks, public networks (e.g., the Internet), private networks (e.g., local area networks (LANs), wide area networks (WANs), etc.), cellular broadband networks (e.g. LTE, CDMA200, EDGE, 5G wireless, etc.), Wi-Fi networks, other network infrastructures and topologies suitable for operations discussed herein, or combinations thereof.

Figure 2A:
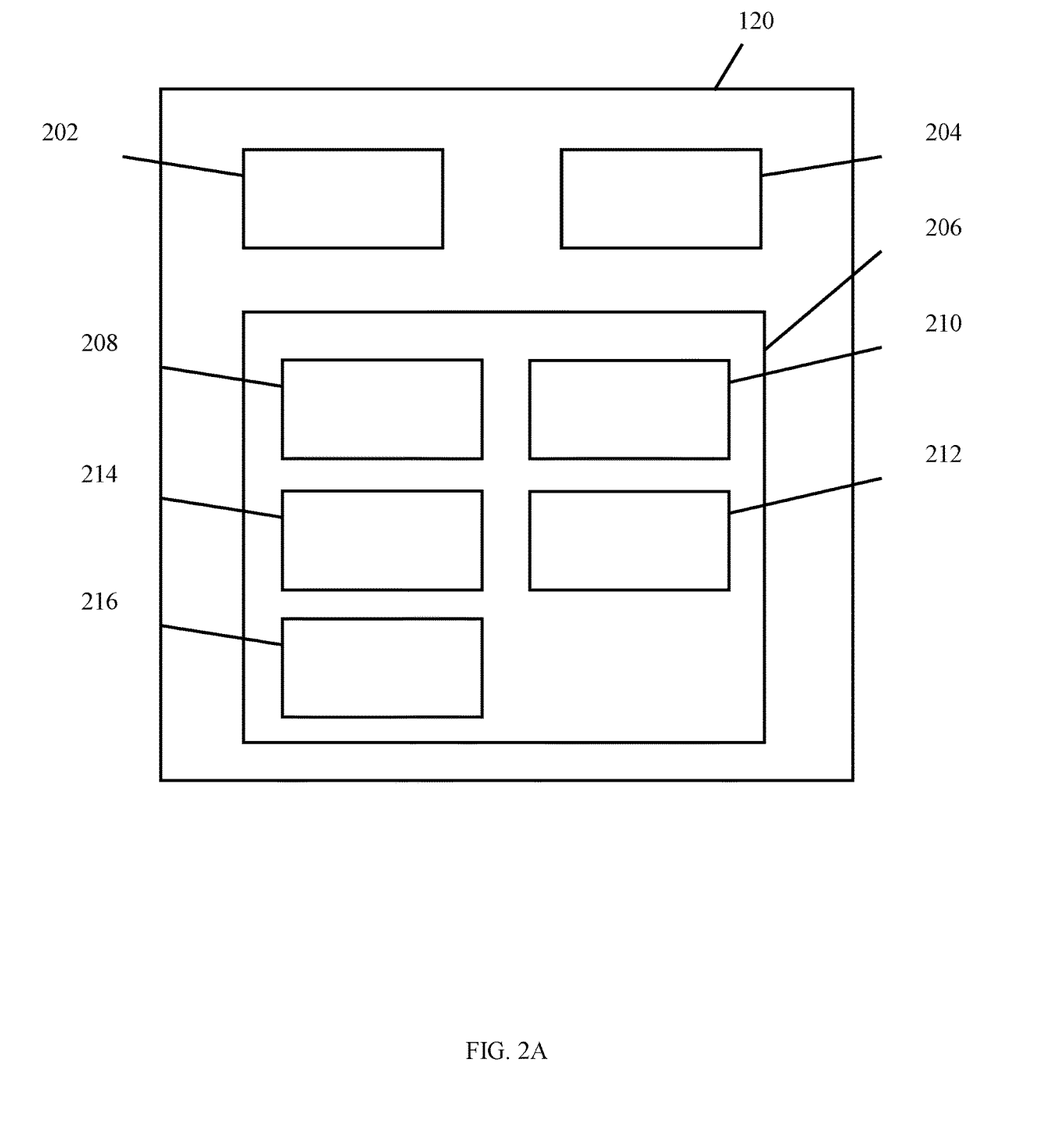
FIG. 2A-C illustrate exemplary block diagrams for elements depicted in FIG. 1.

As depicted in FIG. 2A, server 120 of embodiments includes processor 202, network interface 204, and memory 206. In some embodiments, server 120 may be a game-specific server or may correspond to a gaming platform associated with an online platform (e.g., XboxLive®, Playstation Network®, Steam™, etc.). For example, server 120 may be a platform server and support matchmaking sessions for a variety of games. In another example, server 120 may correspond to a specific game publisher or development studio and, thus, support matchmaking sessions of a particular game. Additionally or alternatively, server 120 may be a private server corresponding to host device 130 that is capable of supporting one or more games.

Processor 202 may include a single processor, or multiple processors, each of which may include a single processing core, multiple processing cores, or combinations thereof. In operation according to embodiments, processor 202 may be configured to perform operations for challenge-based matchmaking, as described below. Network interface 204 is preferably adapted to facilitate communication between server 120 and network 110 and may include, for example, a Bluetooth transceiver, cellular transceiver (e.g., 3G, 4G, 5G, etc.), Wi-Fi transceiver, or combinations thereof. Memory 206 of embodiments may include random access memory (RAM) devices, read-only memory (ROM) devices), flash memory devices, hard disk drives (HDD), solid state drives (SSDs), other memory devices configured to store information in a persistent or non-persistent state, or combinations thereof. In operation according to embodiments, memory 206 may store instructions 208, host data 210, player data 212, game data 214, and session data 216. Instructions 208, when executed by processor 202, preferably cause processor 202 to perform the operations for challenge-based matchmaking, as described below.

Host data 210 of embodiments may include registration and rule information corresponding to data stored by host device 130 (e.g., host data 230) used to facilitate challenge-based matchmaking, as described below. For example, a user corresponding to host device 130 may have a registered account with server 120, and host data 210 may include information associated with the account (e.g., rules associated with one or more matchmaking sessions, user name, password, historical matchmaking information, performance rating corresponding to the user associated with host device 130, amount of money available to the account, etc.) for matchmaking operations. According to embodiments, host data 210 may be received via communications between server 120 and host device 130 over network 110.

Game data 214 of embodiments may include data and executables associated with one or more video games corresponding to one or more challenge-based matchmaking sessions managed and administered according to concepts discussed herein. For example, game data 214 may include software configured to initialize a Street Fighter™ match between two player devices (e.g., two of player devices 140, 150, 160, or 170) over network 110 comprising multiple rounds pursuant to rules set by host data 210. In some embodiments, session data 216 may include information corresponding to a challenge-based matchmaking session such as, for example, challenges received from one or more players (e.g., players corresponding to one or more of player devices 140, 150, 160, and 170) and set aside for allocation. In another example, session data 216 may include a sorted queue of ranked players participating in a challenge-based matchmaking session, a listing of players who have joined the matchmaking session but have not submitted challenges (e.g., as spectators in a lobby corresponding to the session, waiting for the ranked queue to be unfrozen to accept challenge submissions, etc.), other session-related information consistent with operations discussed herein, or combinations thereof.

Additionally, memory 206 may store player data 212 corresponding player data stored on player devices 140, 150, 160, and 170 (e.g., player data 250 corresponding to player devices 140, 150, 160, and 170, as discussed below). Exemplary player data 212 may include account-related information, such as, a user name associated with the player, a performance rating corresponding to the player, an amount of money available to the player's account, and information about the events that the user has administered or participated in. In operation, embodiments of server 120 may use player data 212 to facilitate challenge-based matchmaking, as described below. In some embodiments, the described functionality of server 120 may be implemented on a single server. In alternative embodiments, the functionality of server 120 may be implemented across multiple servers. For example, a first server may be configured to store and process player data (e.g., corresponding to player data 212 and/or session data 216) associated with challenge-based matchmaking for two or more players (e.g., corresponding to one or more players corresponding to player devices 140, 150, 160, and 170), and a second server may be configured to store and process video game data (e.g., corresponding to game data 214) corresponding to video game matches between the players.

Figure 2B:
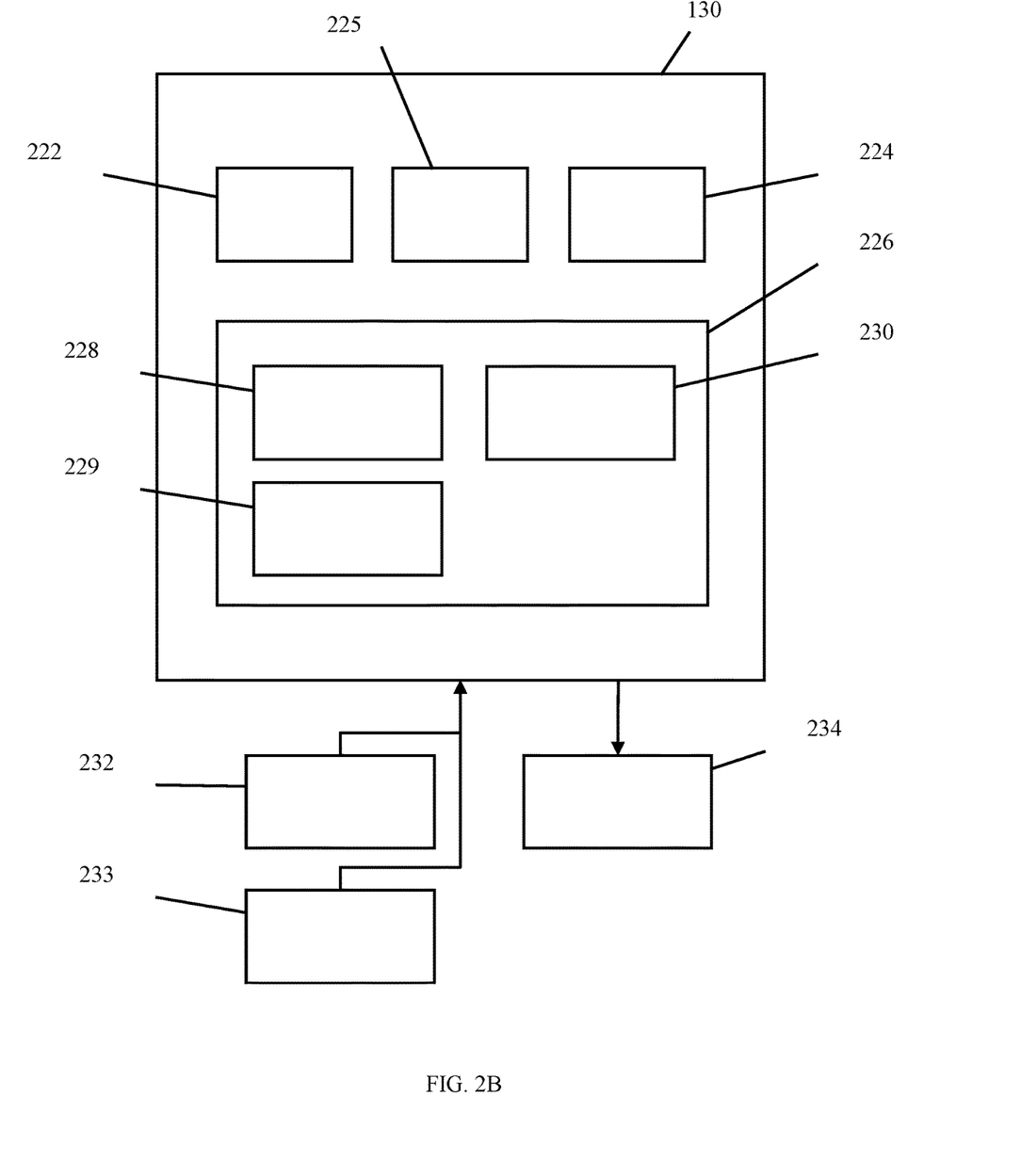

An exemplary representation of host device 130 is depicted in FIG. 2B. Host device 130 preferably includes processor 222, network interface 224, memory 226, input devices 232 and 233, and display 234. For example, host device 130 may include a mobile phone, personal computer, gaming console, or similar device with a network interface adapted to facilitate communication with server 120 and player devices 140, 150, 160, and 170 via network 110 on behalf of a user. In some embodiments, host device 130 may be used to administer and manage a challenge-based matchmaking session. Additionally or alternatively, the user may participate as a player in a challenge-based matchmaking session via host device 130 in accordance with concepts discussed herein.

Processor 222 may include a single processor, or multiple processors, each of which may include a single processing core, multiple processing cores, or combinations thereof. In operation according to embodiments, processor 222 may be configured to perform the functions of host device 130 as described herein (e.g., initiating a challenge-based matchmaking session, setting rules for the same, etc.). Network interface 224 is preferably adapted to facilitate communication between host device 130 and network 110 and may include, for example, a Bluetooth transceiver, cellular transceiver (e.g., 3G, 4G, 5G, etc.), Wi-Fi transceiver, or combinations thereof. Display 234 of embodiments may include a peripheral and/or incorporated monitor, television, touchscreen, or similar device suitable for operations discussed herein. According to embodiments, input devices 232 and 233 may be configured to provide input to the UI of the display and/or a video game. For example, input devices 232 and 233 may include a peripheral and/or embedded touchscreen corresponding to display 234, mouse and/or keyboard, a video game controller, other like control mechanisms, or combinations thereof. It is noted that two input devices (e.g., input devices 232 and 233) are depicted for purposes of illustration, rather than by way of limitation, and, in other embodiments of host device 130, more or less than two input devices may be available.

In some embodiments, host device 130 may include location interface 225. For example, location interface 225 may include a multi-channel satellite antenna, a processor, and a stable clock. Host device 130 of embodiments may be communicatively coupled to a global positioning satellite system via location interface 225, which may in turn provide host device 130's geolocation information to processor 222. Time and location information corresponding to host device 130 may be transmitted to server 120 and/or one or more player devices (e.g., one or more of player devices 140, 150, 160, and 170) to facilitate challenge-based matchmaking. For example, host device 130's location may be communicated to player devices 140, 150, 160, and 170 to identify locations offering off-line, challenge-based competitions administered in accordance with concepts discussed herein.

Memory 226 of embodiments may include RAM devices, ROM devices, flash memory devices, other memory devices configured to store information in a persistent or non-persistent state and suitable for operations described herein, or combinations thereof. In operation according to embodiments, memory 226 may store instructions 228, host interface 229, and host data 230. According to embodiments, instructions 228, when executed by processor 222, may cause processor 222 to perform functions in accordance with the matchmaking operations, as described below. For example, a subset of the instructions stored in memory 226 may correspond to operations associated with host interface 229. In another example, instructions 228 may include instruction for executing a particular game corresponding to a challenge-based matchmaking session on host device 130. Additionally, instructions 228, when executed by processor 222, may allow host device 130 to send and/or receive text, audio, and/or video communications to/from player devices 140, 150, 160, and 170.

Host interface 229 preferably includes one or more graphic user interfaces (GUIs) executing on processor 222 and presented via display 234. According to embodiments, the GUIs of host interface 229 may include fields and/or selectable elements corresponding to input devices 232 and 233 for receiving information from the user corresponding to host device 130. Host interface 229 may be configured for a corresponding user to register, log into, manage, and withdraw from their account (e.g., corresponding to an account stored among host data 210 of server 120); to create, administer and complete one or multiple competitions; and to view information stored in their account. In some embodiments, the user may manually control the timing (e.g., start, end, etc.) of individual matches within a matchmaking session or the session as a whole (e.g., designating a final match of the session, removing players from the session queue, etc.). Additionally, the GUIs of host interface 229 may display information corresponding to a challenge-based matchmaking session to facilitate management thereof. For example, a GUI of host interface 229 may present a summary listing of the number of players in the sorted queue, the respective challenges received from players in the sorted queue, the players participating in an ongoing match of the session, the players in the sorted queue that will be selected for an upcoming match of the session, or combinations thereof.

In some embodiments, host interface 229 and instructions 228 corresponding thereto may be integrated within the operating system of host device 130 or a video game executing on host device 130. Additionally or alternatively, host interface 229 and corresponding instructions 228 may be implemented on host device 130 as standalone software from the operating system or executing video game. In some embodiments, host interface 229 may also include a player interface (e.g., corresponding to player interface 249, as described below) configured to allow the user of host device 130 to participate in a challenge-based matchmaking session in accordance with concepts discussed herein. For example, host interface 229 may be used to facilitate registration, with server 120, of a player who does not have a corresponding player device (e.g., corresponding one of player device 140, 150, 160 or 170). In such embodiments, memory 226 may include player data corresponding to registration of a player using a player interface or host interface 229 (e.g., corresponding to player data 250 discussed below).

According to embodiments, host data 230 may include account information corresponding to host data 210 stored by server 120. In some embodiments, host data 210 may include information corresponding to one or more video games, account information for online video game platforms, or other like information used to execute a video game. Additionally, host data 230 may include rules corresponding to a matchmaking session. For example, host data 230 may include gameplay-specific rules that impose one or more limitations on players (e.g., banning specific characters, maps, third-party assistance tools; setting the duration or structure of each match, setting the occurrence and duration of time periods for accepting challenges, setting a predetermined number of matches for the matchmaking session, etc.). In another example, host data 230 may include rules regarding the types and scope of challenges on which matchmaking will be based (e.g., performance rating value, monetary value, number of prior matches played, win/loss ratio, or combinations thereof) and the minimum performance rating or monetary value and/or threshold prior match history or win/loss ratio to be included a challenge. Additionally, the rules may set specific intervals between matches in a session, the cutoff time prior to the beginning of a match in which the ranked player queue is locked from sorting and/or new or revised challenges, or other controls consistent with operations discussed herein.

In some embodiments, host data 230 may include a sorted queue of ranked players participating in a challenge-based matchmaking session. The sorted queue of host data 230 may correspond to a sorted queue stored as session data 216 by server 120. Additionally, host data 230 may include a listing of players who have not submitted challenges but are joined to the matchmaking session (e.g., as spectators, waiting for the ranked queue to be unfrozen to accept challenge submissions, etc.). It is noted that host device 130 is depicted as a singular device for purposes of illustration, rather than by way of limitation, and, in other embodiments of system 100, host device 130 may correspond to a plurality of host devices, each associated with one or more challenge-based matchmaking sessions. For example, a second host device may cooperate with a first host device to administer a matchmaking session (e.g., initializing individual matches of a session, locking ranked queue from new and/or revised challenges, etc.).

Figure 2C:
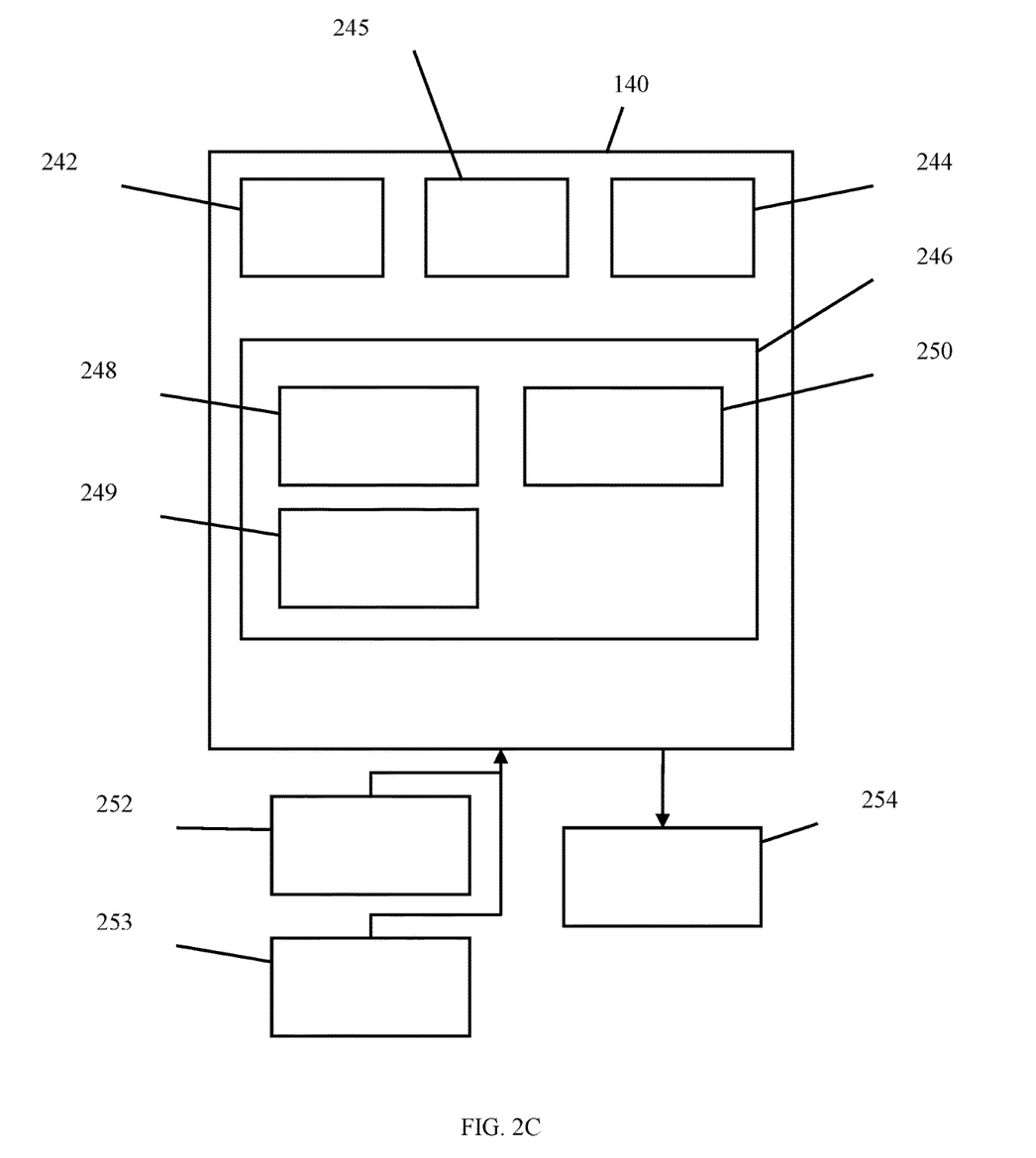

An exemplary representation of player device 140 is depicted in FIG. 2C. It is noted that although embodiments described below in relation to FIG. 2C may refer to player device 140, it should be appreciated that the concepts herein may likewise apply to a plurality of players device (e.g., player devices 150, 160, 170, and more). Player device 140 of embodiments may include processor 242, network interface 244, memory 246, one or more input devices 252 and 253, and display 254. For example, player device 140 may include a mobile phone, personal computer, a video game console, or similar device adapted for operations described herein (e.g., participate in challenge-based matchmaking, execute video games associated with a matchmaking session, etc.) on behalf of a player.

Processor 242 may include a single processor, or multiple processors, each of which may include a single processing core, multiple processing cores, or combinations thereof. In operation according to embodiments, processor 242 may be configured to perform the functions of user device player device 140 as described herein (e.g., submit challenges, player interfaces, etc.). Network interface 244 is preferably adapted to facilitate communication between player device 140 and network 110 and may include, for example, a Bluetooth transceiver, cellular transceiver (e.g., 3G, 4G, 5G, etc.), Wi-Fi transceiver, or combinations thereof. Display 254 may include a peripheral and/or incorporated monitor, a television, an embedded touch-screen, or similar device suitable for operations discussed herein. Input devices 252 and 253 of embodiments may be configured to provide input to a GUI of the display and/or a video game. For example, input devices 252 and 253 may include a peripheral and/or embedded touch-screen corresponding to display 254, a mouse and/or keyboard, a video game controller, other like control mechanisms, or combinations thereof. It is noted that two input devices (e.g., input devices 252 and 253) are depicted for purposes of illustration, rather than by way of limitation, and, in other embodiments of player device 140, more or less than two input devices may be available.

In some embodiments, player device 140 may include location interface 245. For example, location interface 245 may include a multi-channel satellite antenna, a processor, and a stable clock. Player device 140 of embodiments may be communicatively coupled to a global positioning satellite system via location interface 245, which may in turn provide player device 140's geolocation information to processor 242. Time and location information corresponding to player device 140 may be transmitted to server 120 and/or host device 130 to facilitate challenge-based matchmaking. For example, player device 140's location may be used by the corresponding player to identify nearby locations offering off-line, challenge-based competitions administered in accordance with concepts discussed herein. In another example, player device 140's location information may be utilized by server 120 and/or host device 130 in online matchmaking as weights for sorting matchmaking queues (discussed below) to diversify match competitors based on location.

Memory 246 of embodiments may include RAM devices, ROM devices, flash memory devices, other memory devices configured to store information in a persistent or non-persistent state and suitable for operations described herein, or combinations thereof. In operation according to embodiments, memory 246 may store instructions 248 and player data 250. Instructions 248, when executed by processor 242, preferably cause processor 242 to perform operations in accordance with the concepts described herein. For example, a subset of the instructions stored in memory 246 may correspond to operations associated with player interface 249. In another example, instructions 248 may include instructions for executing a particular game corresponding to a challenge-based matchmaking session on player device 140. Additionally, instructions 248 may include instructions configured to allow player device 140 to send and/or receive text, audio, and/or video communications to/from host device 130 and/or player devices 150, 160, and 170.

Player data 250 preferably includes account information corresponding to player data 210 stored by server 120. In some embodiments, player data 250 may include information corresponding to one or more video games, account information for online video game platforms, or other like information used to execute a video game. Exemplary player data 250 corresponding to the player may include a performance rating associated with the player, an amount of money available to the player's account, and information about the events that the player has participated in (e.g., number of games played, win/loss ratio, etc.).

In some embodiments, memory 246 also stores data associated with player interface 249. Player interface 249 of embodiments and instructions 248 corresponding thereto may be integrated within the operating system of player device 140 or a video game executing on player device 140. Additionally or alternatively, player interface 249 and corresponding instructions 248 may be implemented on player device 140 as standalone software from the operating system or executing video game. In alternative embodiments, player device 140 and memory 246 may not include instructions and data corresponding to player interface 249, and host device 130 may be configured to provide a player with matchmaking controls consistent with concepts discussed herein.

Player interface 249 of embodiments may include one or more GUIs executing on processor 242 and presented via display 254. The GUIs of player interface 249 are preferably configured to allow a player (e.g., corresponding to a user of one or more of player devices 140, 150, 160 and 170) to register, log into, manage, and withdraw from their account (e.g., corresponding to an account stored among player data 212 of server 120); find and join a challenge-based matchmaking session as a participant or spectator; submit or revise challenges to enter a queue for a session; leave the queue and/or matchmaking session; communicate with other players (e.g., corresponding to one or more of player devices 140, 150, and 160) and/or the session host (e.g., corresponding to host device 130); other operations consistent with concepts discussed herein; or combinations thereof. Embodiments of player interface 249 may include one or more fields and/or selectable controls (e.g., buttons, drop-down menus, touch-selectors, etc.) corresponding to input devices 252 and 253 and configured for receiving information from the player corresponding to player device 140. In additional embodiments, player interface 249 may be configured to provide session-related information to the player. For example, a GUI of player interface 249 may display the sorted queue of ranked players corresponding to a matchmaking session. In another example, player interface 249 may present a summary of a player's (e.g., corresponding to player device 140) current outstanding challenge(s) and a listing of other players in the sorted queue for a matchmaking session and the players' respective challenges.

In operation according to embodiments, a challenge-based matchmaking system according to FIG. 1 may initialize a challenge-based matchmaking session. The matchmaking session is preferably initialized pursuant to rules specified by host device 130. In some embodiments, server 120 automatically performs operations for facilitating the matchmaking session, as discussed herein (e.g., receiving challenges from player devices 140, 150, 160, and 170; sorting players based on received challenges; validating received challenges; initializing individual matches between players; partitioning received challenges for competing players; etc.), pursuant to rules specified by host device 130. Alternatively, host device 130 may perform operations for facilitating the matchmaking session, and server 120 supports the operations of host device 130 by storing game data 214, session data 216, host data 210, and/or player data 212 and facilitating session-related communication traffic between host device 130 and player devices 140, 150, 160, and 170.

According to embodiments, a user (e.g., host) may create a matchmaking session via host device 130 and specify rules (e.g., corresponding to host data 230) setting forth session parameters, such as, the particular game to be played, the types of challenges used by the session (e.g., thresholds and/or increments for rating values, monetary values, win/loss ratios, etc.), time periods for receiving new and/or revised challenges, number of matches to be played, and whether the session will be public (e.g., accessible to any player corresponding to player devices 140, 150, 160, and 170) or private (e.g., accessible by invitation, passcode, etc.). The host preferably uses host interface 229 to manage the matchmaking session by, for example, opening and closing session queue(s) for entry, declaring a winning player for one or more matches of the session, locking the session queue(s) from receiving challenges prior to and/or during a match of the session, specifying rules corresponding to the matchmaking session, other operations consistent with concepts discussed herein, or combinations thereof. According to embodiments, rules and controls (e.g., corresponding to host data 230) specified by host device 130 are communicated to server 120 via network 110 as session control information 132.

In response to receiving session control information 132, server 120 of embodiments may store session rules specified by host device 130 as session data 216 and administer one or more matchmaking sessions pursuant to the specified rules. In operation according to embodiments, server 120 may establish one or more queues corresponding to a matchmaking session in session data 216. The session queue(s) are preferably configured to allow a plurality of players corresponding to player devices 140, 150,160, and 170 to join the queue(s) and submit challenges to participate in the matchmaking session. Additionally, server 120 may be configured to distinguish between the host and the players via respective accounts corresponding to the same that are stored as host data 210 and player data 212 in memory 206. For example, the host (e.g., a user corresponding to host device 130) and one or more players (e.g., players corresponding to one or more of player devices 140, 150, 160, and 170) have each have separate accounts with server 120 that includes information, such as, username, password, performance ratings, amount of available money, prior session histories, etc.

In operation according to embodiments, one or more of player devices 140, 150, 160, and 170 may submit (e.g., transmit) challenges 142, 152, 162, and 172, respectively, to host device 130 and/or server 120 via network 110. The plurality of players joined to the matchmaking session may be classified into ranked (e.g., those who have submitted challenges) and unranked players (e.g., those who have not submitted challenges). For example, four players corresponding to player devices 140, 150, 160, and 170 may each separately join the matchmaking session as participating players. In another example, two players corresponding to player devices 140 and 150 may join the matchmaking session as a team, occupying one spot in the queue. The ranked players are preferably organized in a ranked queue that may be re-sorted in response to newly submitted, revised, or withdrawn challenges. For example, server 120 may create a ranked session queue that includes players who have submitted challenges and an unranked queue that includes players who have not submitted challenges. In another example, a single queue may be created with unranked players (e.g., those who have not submitted challenges) sorted at the bottom of the queue.

In response to receiving challenges 142, 152, 162, and 172 from player devices 140, 150, 160, and 170, server 120 of embodiments may sort the queues of ranked players according to rules specified by host data 210. The queues administered by server 120 may be re-sorted in response to new challenges received from unranked players, revised challenges received from ranked players, one or more ranked players leaving the ranked queue and/or session (e.g., challenge withdrawal). The re-sort timing is preferably set by rules specified by host device 130 and stored as session data 216. According to embodiments, the queues may be locked within a predetermined amount of time prior to the start of a match of the session. The time at which the ranked queue is locked may be set, for example, by rules specified by host device and stored in host data 210. Additionally or alternatively, the queue may be locked in response to a control signal received from host device 130 via session control information 132. Ranked queue(s) of embodiments may be unlocked and sorting resumed, for example, once a particular match has commenced, after the completion of a particular match, or in response to a control signal via session control information 132 from host device 130.

After the sorted queue of ranked players has been locked, server 120 may select top-ranked players within the queue as challengers for a match of the matchmaking session. For example, if a particular game consists of a head-to-head match between two players, server 120 may select and remove two top-ranked players from the queue as challengers. In another example, for a game consisting of a free-for-all match between four players, server 120 may select and remove four top-ranked players from the queue as challengers. Server 120 preferably validates that the challenge corresponding to each challenger pursuant to rules set by host device 130 and according to concepts discussed herein. For example, server 120 may confirm that a rating value included in the challenge received from the player corresponding to player device 140 does not exceed the player's performance rating, as stored in an account associated with the player in player data 212. If a player's challenge is invalid, the player may be removed from the match and a replacement challenger selected from the ranked queue. Additionally or alternatively, host device 130 may select and validate the challengers for each match and communicate the same to server 120 via session control information 132. The validated challenges received from the designated challengers are preferably set aside in session data 216 for the duration of a particular match and/or the duration of the session in accordance with concepts discussed herein.

After challengers are selected for a particular match, server 120 may initialize a match by transmitting match control information 122 to the player devices corresponding to the players who have been designated as challenges for the particular match. Match control information 122 preferably includes gameplay and session rules specified by host device 130 and stored in host data 210. Additionally or alternatively, the match may be initialized in response to a control signal received from host device 130 via session control information 132.

In response to match control information 122, a match may be initialized between the designated challengers (e.g., a first match). In some embodiments, the game of the matchmaking session may execute on one or more player devices (e.g., corresponding to player devices 140, 150, 160, and/or 170) and/or host device 130. For example, player devices 140 and 150 may each have a running instance of a particular video game, and the match control information 122 allows the respective video game instances to link together in an online video game match. Alternatively, the match may be conducted on a standalone video game system executing the video game corresponding to the session. For example, the players corresponding to player devices 140 and 150 may play a separate, offline match on a standalone video arcade system. According to embodiments, host device 130 may be configured to spectate or observe the progress of the match via host interface 229. Additionally, one or more player devices may be configured to spectate or observe the progress of the match via player interface 249.

Upon completion of the match, a winning and losing player may be designated. For example, in a head-to-head match between two players corresponding to player devices 140 and 150, a first player may be designated the winner and a second player may be designated the loser. In another example involving two teams of three players, a first team of three players may be designated as winners, and a second team of three players may be designated as losers. The winning and losing players may be designated by host device 130 and/or by server 120. With the winning and losing player designated, server 120, pursuant to rules specified by host device 130 or under the manual control of host device 130, may automatically partition and allocate portions of the set-aside challenge corresponding to the losing player in accordance with concepts discussed herein. For example, a set-aside first portion of the losing player's challenge may be allocated to the winning player's account in player data 212 (e.g., performance rating, amount available to the account, etc.), a set-aside second portion of the losing player's challenge may be allocated to a collective repository in session data 216 designated for later allocation (e.g., champion of the session, as discussed below), a set-aside third portion of the losing player's challenge may be allocated to a host account in host data 210 associated with the host corresponding to host device 130 (e.g., mitigate against rating inflation, management costs, etc.), a set-aside fourth portion of the losing player's challenge may be allocated to an account corresponding to a business entity associated with server 120 (e.g., mitigate against rating inflation, maintenance costs, etc.).

According to embodiments, the winner of the match may be designated as a player in a directly subsequent match of the session (e.g., a second match) and an additional player may be selected from the sorted queue of ranked players as a challenger in the directly subsequent match. The queue is preferably resorted during the prior match or after the prior match has been completed. For example, players within the ranked queue may have revised or withdrawn challenges, previously unranked players may have submitted new challenges, or the losing player of the prior match has submitted a renewed challenge. The second match may be initialized and completed pursuant to concepts discussed above. Additionally, one or more subsequent matches may be initialized and completed pursuant to concepts discussed above.

According to embodiments, progressive matches of the session may be initialized and completed until a final match of the session. The final match of the session may be manually designated by host device 130, or the final match may be specified by rules set by the host device 130. Upon completion of the final match, server 120 and/or host device 130 may designate a champion for the session and a losing player of the final match. In operation according to embodiments, server 120, automatically pursuant to rules specified by host device 130 or under the manual control of host device 130, may allocate portions of the set-aside challenge corresponding to the losing player of the final match in accordance with concepts discussed herein. For example, any set-aside challenge received from champion may be returned to the player, and the set-aside challenge received from the losing player may be partitioned and allocated in accordance with concepts discussed above. Additionally, server 120 may allocate previously set-aside challenge portions from losing players of prior matches of the session for distribution (e.g., transfer, deposit, etc.) to the champion of the session.

Figure 3:
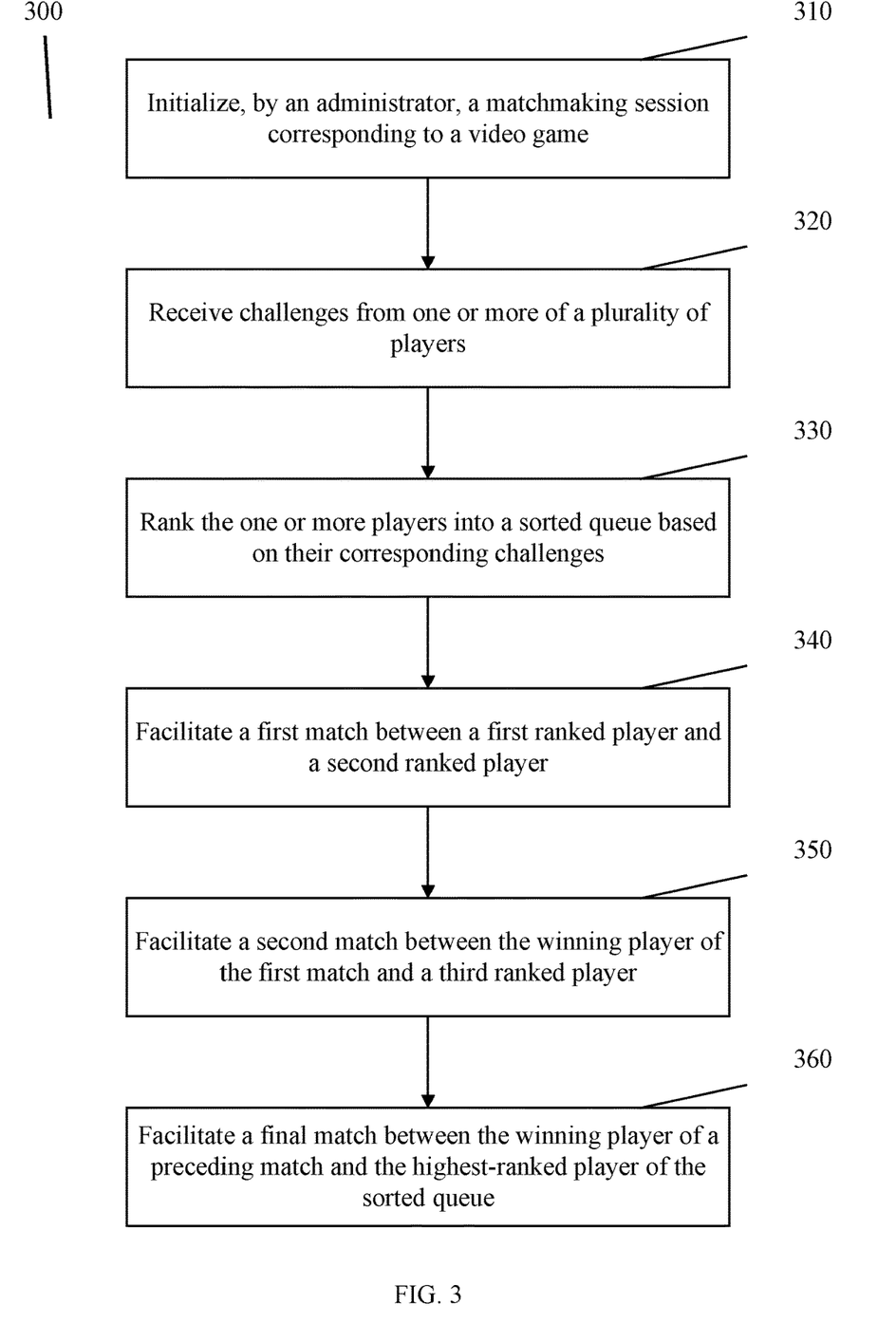
FIG. 3 illustrates a flow diagram of an exemplary method for challenge-based matchmaking in accordance with embodiments of the present invention.

Referring to FIG. 3, a flow diagram of an exemplary method for administering a challenge-based matchmaking session is depicted. In an embodiment, method 300 may be performed by a server (e.g., corresponding server 120 of FIG. 1). Although embodiments are described below with respect to a single, challenge-based matchmaking session involving a single host device (e.g., corresponding to host device 130 of FIG. 1), and one or more player devices (e.g., corresponding to one or more of player devices 140, 150, 160 and 170 of FIG. 1), it should be appreciated that the concepts herein may likewise apply to a plurality of host devices, a plurality of servers, and a plurality of player devices involved in more than one matchmaking session.

At step 310, initialize, by an administrator, a matchmaking session corresponding to a video game. The matchmaking session is preferably initialized pursuant to rules specified by a host device (e.g., corresponding to host device 130 of FIG. 1). The session may be initialized by either the host device or a server (e.g., corresponding to server 120 of FIG. 1) at the request of the host device. According to embodiments, initializing the matchmaking session may include establishing a queue for a plurality of players to join and submit challenges. Preferably, each player joining the queue has a corresponding account registered with the server in accordance with concepts discussed herein. Some players may join the queue via a GUI on a corresponding player device (e.g., corresponding to one or more of player devices 140, 150, 160, 170), while other players may utilize a player GUI on the host device. In some embodiments, players may join the queue without submitting a challenge. For example, one or more players (e.g., one or more players corresponding to one or more of player devices 140, 150, 160, 170) may join the session queue as spectators.

At step 320, receive challenges from one or more of a plurality of players. According to embodiments, players from whom challenges are received may be classified separately from players who join the matchmaking session without submitting a challenge. For example, the session queue may include a primary, ranked queue including players who have submitted challenges and a secondary, unranked queue including players who have not submitted challenges. For example, two, separate queues may be used for the matchmaking session, one for ranked player and the other for unranked players. In another example, a sub-queue within the primary queue may be used to group together players who have not submitted challenges. According to embodiments, challenges may be received from a plurality of players for a predetermined period of time in accordance with session rules established by the host (e.g., corresponding to one or more rules of host data 210 and/or 230 of FIGS. 2A and/or 2B). For example, initial challenges may be accepted from players for one hour before the queue is locked for the start of a match. In another example, the queue may be locked two minutes before the start of a match and unlocked again for challenge submissions after the match begins or after the match ends.

At step 330, rank the one or more players into a sorted queue. Players are preferably ordered in the sorted queue based on their submitted challenge, and players with equivalent challenges are ordered by secondary metrics, such as, timing of challenge, number of matches played for the video game of the matchmaking session or other games in same genre, win/loss ratio of prior games, etc. For example, two players submitting challenges with equivalent performance rating values may be sorted based on whoever's challenge was submitted earlier. In another example, two players submitting challenges with equivalent monetary values may be sorted based on whoever had more prior matches played. The ranked player queue is preferably re-sorted in response to new challenges received from unranked players, revised challenges received from ranked players, one or more ranked players leave the queue. The re-sort timing may be set by rules specified by the host device. According to embodiments, the ranked queue may be locked from re-sorting after a predetermined period of time or under the control of the host device.

At step 340, facilitate a first match between a first ranked player and a second ranked player. Accordingly to some embodiments, the top two players in the sorted queue of ranked players are removed from the queue and the remaining players in the queue are shifted to fill the vacancy. Although the first and second ranked players may each correspond to an individual player, in some embodiments, the first and second ranked players in the sorted session queue may correspond to a team of two or more players. At the conclusion of the first match, a winning player and a losing player are preferably designated, and the winning player may be automatically included in a subsequent match of the matchmaking session.

According to embodiments, challenges received from and corresponding to the first and second ranked players may be removed from the players' accounts (e.g., corresponding to of FIG. 1) and set aside until the completion of the first match. For example, rating values included in the first and second ranked players' challenges may be deducted from their respective performance ratings (e.g., performance ratings corresponding to one or more of player data 212 and/or 250 of FIGS. 2A and/or 2C). In another example, monetary values included in the first and second ranked players' challenges may be deducted from their respective accounts. In some embodiments, the received challenges corresponding to the first and second players are validated. For example, if the rating value included in the challenge received from the second player exceeds the second player's performance rating, the challenge is invalid. As such, the second player may be replaced in the first match with the top-ranked player in the sorted queue. In another example, if the monetary value included in the challenge received from the first player exceeds the amount of money available to the first player's account (e.g., corresponding to one or more of player data 212 and/or 250 of FIGS. 2A and/or 2C), the challenge is invalid and the first player may be replaced in the first match with the top-ranked player in the sorted queue.

The set-aside challenges corresponding to the first and second ranked players are preferably partitioned for allocation during the matchmaking session. For example, a first portion of the set-aside challenge corresponding to the losing player may be allocated for the winning player, a second portion of the set-aside challenge may be allocated for a player that defeats the current lead player, a third portion may be allocated for the winning player of the final match, a fourth portion may be allocated to the host for administering the matchmaking session, and a fifth portion may be allocated to the server. Allocating a portion of the challenge to non-players (e.g., host device 130 and/or server 120) may serve to mitigate against inflation of performance ratings. In another example, a portion of the challenge may be allocated to the host or the server to cover administrative costs for managing the matchmaking session.

In some embodiments, players may submit new challenges or revise their prior challenges during the first match. Additionally or alternatively, new or revised challenges may be accepted only for a predetermined period of time (e.g., seconds, minutes, hours, etc.) after the conclusion of the first match. For example, a one-minute window may be provided after the first match to accepted challenges from players already sorted in the session queue, players that are not sorted in the session queue, or from the losing player of the first match. The predetermined period of time preferably corresponds to one or more rules set by the host device. Additionally or alternatively, the host device may transmit instructions to the server and/or player devices to close receipt of challenges in advance of a subsequent match of the session or the termination of the session.

According to embodiments, at the conclusion of the first match, the server or the host device may allocate a set-aside first portion of the losing player's challenge to the winning player's account and a set-aside second portion of the losing player's challenge may be allocated to a collective repository (e.g., corresponding to information in session data 213 of FIG. 2A) designated for later allocation. For example, the set-aside second portion may be allocated to a player who defeats the winning player of the first match of the session, the winner of a final match of the session, or both. In some embodiments, a set-aside third portion of the losing player's challenge may be allocated to a host account (e.g., corresponding to host data 210 and/or 230 of FIGS. 2A and/or 2B) corresponding to the host administering the matchmaking session. Additionally or alternatively, a set-aside fourth portion of the losing player's challenge may be allocated to an account corresponding to the server facilitating the matchmaking session to maintain the infrastructure of the challenge-based matchmaking system (e.g., to mitigate against rating inflation, for maintenance costs, etc.). In some embodiments, the winning player's set aside challenge may be similarly allocated and distributed in accordance with concepts discussed herein.

At step 350, facilitate a second match between the winning player of the first match and a third ranked player. Accordingly to embodiments, the third player corresponds to the top-ranked player in the sorted queue of ranked players. The third player is preferably removed from the queue, and the remaining players in the queue are shifted to fill the vacancy. Moreover, the ranked queue of embodiments may re-sorted based on new and/or revised challenges received from players. For example, the third player may be the losing player from the first match who has resubmitted a challenge sufficient for ranking ahead of other players in the queue. In another example, the third player may not have participated in the first match nor submitted a challenge prior to the first match.

A video game match is preferably initialized between the winning player from the first match and the third player pursuant to rules set by via the host device (e.g., duration, gameplay settings, etc.). At the conclusion of the second match, a winning player and a losing player are preferably designated, and the winning player of the second match may be automatically included in a subsequent match of the matchmaking session. In some embodiments, challenges received from and corresponding to the third player may be removed from the third player's account (e.g., corresponding to of FIG. 1) and set aside until the completion of the second match (e.g., stored in a repository corresponding to information in session data 213 of FIG. 2A). For example, if the third player is the losing player of the second match, a set-aside first portion of the third player's challenge may be allocated to the winning player, a set-aside second portion may be allocated to one or more winners of subsequent session matches, a set-aside third portion may be allocated to a host account, a set-aside forth portion allocated to the system infrastructure, or combinations thereof. In another example, if the losing player of the second match is the winning player from the first match, portions of the challenge previously set aside are allocated to the challenge received and set aside during the first match is allocated in accordance with concepts discussed herein.

At step 360, facilitate a final match between the winning player of a preceding match and the highest-ranked player of the sorted queue. Preferably, there are one or more intervening matches in the session between the second match and the final match; however, in some embodiments, the proceeding match to the final match may be the second match. According to embodiments, the highest-ranked player of the sorted queue may be removed from the queue and designated the final challenger. Moreover, prior to the start of the final match, the ranked queue of embodiments may re-sorted based on new and/or revised challenges received from one or more players. The final match between the winning player of the preceding match and the final challenger is preferably initialized pursuant to rules specified by via the host device.

After the final match of the session, any set-aside challenge received from the winning player of the final match is returned to the player. For example, if the challenge received from the winning player of the final match was previously set aside during a prior match within the session, the set-aside challenge (e.g., rating value, monetary value, etc.) is returned to the player's account (e.g., corresponding to player data 250). In another example, if the winning player of the final match is the final challenger, the challenge received from the final challenger is returned to the player. According to embodiments, the challenge received from the losing player of the final match may be partitioned consistent with concepts discussed above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A system comprising:
   an electronic data store configured to facilitate session-related communication traffic corresponding to at least one video game and a plurality of players;
   at least one processor communicatively coupled to the electronic data store and configured to execute computer-executable instructions to perform operations;
   at least one memory which may store computer-executable instructions and player data comprising:
      initialize, by a host device or a server, a matchmaking session corresponding to a video game, wherein the matchmaking session includes the plurality of players and a plurality of matches corresponding to the video game, wherein the stored player data includes an account corresponding to each of the plurality of players;
      during a predetermined time period, opening one or more session queues to receive challenges corresponding to a performance rating or a monetary value or both from one or more of the plurality of players;
      rank the one or more of the plurality of players based on their corresponding challenges, wherein the one or more of the plurality of players who submitted challenges are classified as ranked players and players of the plurality of players who did not submit a challenge are classified as unranked players, and wherein ranking includes organizing the ranked players in a sorted queue, and wherein players are further ranked by one or more secondary metrics comprising timing of challenge submission, number of matches played for the video game, or win/loss ratio of prior games;
      after the predetermined time period, transmit computer-executable instructions to the server to close the one or more session queues, locking the one or more session queues from receiving challenges corresponding to the performance rating or the monetary value or both to facilitate a first match between a first ranked player and a second ranked player of the sorted queue of ranked players, wherein the first match results in a winning player and a losing player, and wherein facilitating the first match includes communicatively coupling devices associated with the first ranked player and the second ranked player, communicating rules and controls via a network as session control information for a session between a device of the first ranked player and a device of the second ranked player, and partitioning a first challenge corresponding to the performance rating or the monetary value or both received from the losing player of the first match and allocating at least a portion of the first challenge to the winning player of the first match;
   subsequent to the first match, the host device transmits computer-executable instructions to the server to facilitate a second match between the winning player of the first match and a third ranked player of the sorted queue of ranked players, wherein the second match results in a winning player and a losing player, and wherein facilitating the second match includes communicatively coupling devices associated with the winning player of the first match and the third ranked player, communicating the rules and controls via the network as session control information for a session between a device of the winning player of the first match and a device of the third ranked player, and partitioning a second challenge corresponding to the performance rating or the monetary value or both received from the losing player of the second match and allocating at least a portion of the second challenge to the winning player of the second match, wherein at least the portion of the second challenge includes a portion of the first challenge allocated to the winning player of the first match when the winning player of the second match is the third ranked player; and
   the host device transmits computer-executable instructions to the server to facilitate a final match between the winning player of a preceding match and a highest-ranked player of sorted queue of ranked players, wherein the final match results in a champion player and a losing player, and wherein facilitating the final match includes communicatively coupling devices associated with the winning player of the preceding match and the highest ranked player, communicating the rules and controls via the network as session control information, for a session between a device of the winning player of the preceding match and a device of the highest-ranked player, and partitioning a final challenge corresponding to the performance rating or the monetary value or both received from the losing player of the final match and allocating at least a portion of one or more preceding challenges to a winning player of the final match, wherein at least the portion of the final challenge includes a portion of the one or more preceding challenges allocated to the winning player of the one or more preceding match when the winning player of the final match is the highest-ranked player.

2. The system of claim 1, wherein the operations further comprise:
validating each challenge received from the ranked players; and
prior to facilitating a match of the matchmaking session, re-ranking the one or more of the ranked players based on their validated challenges, wherein re-ranking includes re-classifying one or more of the ranked players with invalid challenges as unranked players.

3. The system of claim 2, where the account corresponding to each of the plurality of players includes information indicating the performance rating of the corresponding player, wherein the challenge corresponding to each ranked player includes a rating value, and wherein validating each received challenge includes verifying that the rating value of the challenge corresponding each ranked player does not exceed the performance rating corresponding to the ranked player.

4. The system of claim 2, where the account corresponding to each of the plurality of players includes information indicating the monetary value available to the account of the corresponding player, wherein the challenge corresponding to each ranked player includes the monetary value, and wherein validating each received challenge includes verifying that the monetary value of the challenge corresponding to each ranked player does not exceed the monetary value available to the corresponding ranked player's account.

5. The system of claim 1, wherein the operations further comprise:
prior to facilitating the second match of the matchmaking session, receiving a rematch challenge from the losing player of the first match; and
prior to facilitating the second match of the matchmaking session, re-ranking the one or more players based on their revised challenges.

6. The system of claim 1, wherein the operations further comprise:
receiving a challenge from at least one of the unranked players;
reclassifying the at least one of the unranked players submitting a challenge as a ranked player; and
prior to facilitating a match of the matchmaking session, re-ranking the ranked players based on the received challenges corresponding to the ranked player.

7. The system of claim 1, wherein the account corresponding to each of the plurality of players includes a performance rating, wherein the challenge corresponding to each ranked player includes a rating value, wherein partitioning the challenge received from the losing player of the first match for allocation includes:
decreasing the performance rating corresponding to the losing player of the first match is by the rating value associated with the challenge corresponding to the losing player,
increasing the performance rating associated with the winning player of the first match by a first portion of the rating value associated with the challenge corresponding to the losing player of the first match, and
reserving a second portion of the rating value associated with the challenge corresponding to the losing player of the first match for the champion player of the final match.

8. The system of claim 1, wherein the account corresponding to each player of the plurality of players includes information indicating the monetary value available to the account, wherein the challenge corresponding to each ranked player includes at least a portion of the monetary value available to the account, and wherein partitioning the challenge received from the losing player of the first match for allocation includes:
decreasing the monetary value available to the account corresponding to the losing player of the first match by the monetary value associated with the challenge corresponding to the losing player of the first match,
increasing the monetary value available to the account corresponding to the winning player of the first match by a first portion of the monetary value associated with the challenge corresponding to the losing player of the first match,
reserving a second portion of the monetary value associated with the challenge corresponding to the losing player of the first match for the champion player of the final match, and
reserving a third portion of the monetary value associated with the challenge corresponding to the losing player of the first match for an administrator.

9. The system of claim 1, wherein the sorted queue of ranked players is organized in a descending order based on the challenges corresponding to each ranked player.

10. The system of claim 9, wherein ranked players with equal corresponding challenges are sorted in descending order based on the predetermined time period that the challenges were received.

11. A method comprising:
initializing a matchmaking session corresponding to a video game, wherein the matchmaking session includes a plurality of players and a plurality of matches corresponding to the video game, wherein each of the plurality of players has a corresponding account;
during a predetermined time period, opening one or more session queues to receive challenges corresponding to a performance rating or a monetary value or both from one or more of the plurality of players;
ranking the one or more of the plurality of players based on their corresponding challenges, wherein the one or more of the plurality of players who submitted challenges are classified as ranked players and players of the plurality of players who did not submit a challenge are classified as unranked players, and wherein ranking includes organizing the ranked players in a sorted queue, and wherein players are further ranked by one or more secondary metrics comprising timing of challenge submission, number of matches played for the video game, or win/loss ratio of prior games;
after the predetermined time period, transmitting computer-executable instructions to a server to close the one or more session queues, locking the one or more session queues from receiving challenges corresponding to the performance rating or the monetary value or both to facilitate a first match between a first ranked player and a second ranked player of the sorted queue of ranked players, wherein the first match results in a winning player and a losing player, and wherein facilitating the first match includes communicatively coupling devices associated with the first ranked player and the second ranked player, communicating rules and controls via a network as session control information for a session between a device of the first ranked player and a device of the second ranked player, and partitioning a first challenge corresponding to the performance rating or the monetary value or both received from the losing player of the first match and allocating at least a portion of the first challenge to the winning player of the first match;

subsequent to the first match, transmitting, by a host device, computer-executable instructions to the server to facilitate a second match between the winning player of the first match and a third ranked player of the sorted queue of ranked players, wherein the second match results in a winning player and a losing player, and wherein facilitating the second match includes communicatively coupling devices associated with the winning player of the first match and the third ranked player, communicating the rules and controls via the network as session control information for a session between a device of the winning player of the first match and a device of the third ranked player, and partitioning a second challenge corresponding to the performance rating or the monetary value or both received from the losing player of the second match and allocating at least a portion of the second challenge to the winning player of the second match, wherein at least the portion of the second challenge includes a portion of the first challenge allocated to the winning player of the first match when the winning player of the second match is the thirdranked player; and transmitting, by the host device, computer-executable instructions to the server to facilitate a final match between the winning player of a preceding match and a highest-ranked player of sorted queue of ranked players, wherein the final match results in a champion player and a losing player, and wherein facilitating the final match includes communicatively coupling devices associated with the winning player of the preceding match and the highest ranked player, communicating the rules and controls via the network as session control information, for a session between a device of the winning player of the preceding match and a device of the highest-ranked player, and partitioning a final challenge corresponding to the performance rating or the monetary value or both received from the losing player of the final match and allocating at least a portion of one or more preceding challenges to a winning player of the final match, wherein at least the portion of the final challenge includes a portion of the one or more preceding challenges allocated to the winning player of the one or more preceding match when the winning player of the final match is the highest-ranked player.

12. The method of claim 11, wherein the method further comprises:
validating each challenge received from the ranked players; and
prior to facilitating a match of the matchmaking session, re-ranking the one or more of the ranked players based on their validated challenges, wherein re-ranking includes re-classifying one or more of the ranked players with invalid challenges as unranked players.

13. The method of claim 12, where the account corresponding to each of the plurality of players includes information indicating the performance rating of the corresponding player, wherein the challenge corresponding to each ranked player includes a rating value, and wherein validating each received challenge includes verifying that the rating value of the challenge corresponding each ranked player does not exceed the performance rating corresponding to the ranked player.

14. The method of claim 11, wherein the account corresponding to each of the plurality of players includes a performance rating, wherein the challenge corresponding to each ranked player includes a rating value, wherein partitioning the challenge received from the losing player of the first match for allocation includes:
decreasing the performance rating corresponding to the losing player of the first match is by the rating value associated with the challenge corresponding to the losing player,
increasing the performance rating associated with the winning player of the first match by a first portion of the rating value associated with the challenge corresponding to the losing player of the first match, and
reserving a second portion of the rating value associated with the challenge corresponding to the losing player of the first match for the champion player of the final match.

15. The method of claim 11, wherein the account corresponding to each player of the plurality of players includes information indicating the monetary value available to the account, wherein the challenge corresponding to each ranked player includes at least a portion of the monetary value available to the account, and wherein partitioning the challenge received from the losing player of the first match for allocation includes:
decreasing the monetary value available to the account corresponding to the losing player of the first match by the monetary value associated with the challenge corresponding to the losing player of the first match,
increasing the monetary value available to the account corresponding to the winning player of the first match by a first portion of the monetary value associated with the challenge corresponding to the losing player of the first match,
reserving a second portion of the monetary value associated with the challenge corresponding to the losing player of the first match for the champion player of the final match, and
reserving a third portion of the monetary value associated with the challenge corresponding to the losing player of the first match for an administrator.

16. One or more non-transitory computer-readable media comprising instructions that when executed by a computer system cause the computing system to:
initialize, by a host device or a server, a matchmaking session corresponding to a video game, wherein the matchmaking session includes a plurality of players and a plurality of matches corresponding to the video game, wherein a stored player data includes an account corresponding to each of the plurality of players;
during a predetermined time period, opening one or more session queues to receive challenges corresponding to a performance rating or a monetary value or both from one or more of the plurality of players;
rank the one or more of the plurality of players based on their corresponding challenges, wherein the one or more of the plurality of players who submitted challenges are classified as ranked players and players of the plurality of players who did not submit a challenge are classified as unranked players, and wherein ranking includes organizing the ranked players in a sorted queue, and wherein players are further ranked by one or more secondary metrics comprising timing of challenge submission, number of matches played for the video game, or win/loss ratio of prior games;

after the predetermined time period, transmit computer-executable instructions to the server to close the one or more session queues, locking the one or more session queues from receiving challenges corresponding to the performance rating or the monetary value or both to facilitate a first match between a first ranked player and a second ranked player of the sorted queue of ranked players, wherein the first match results in a winning player and a losing player, and wherein facilitating the first match includes communicatively coupling devices associated with the first ranked player and the second ranked player, communicating rules and controls via a network as session control information for a session between a device of the first ranked player and a device of the second ranked player, and partitioning a first challenge corresponding to the performance rating or the monetary value or both received from the losing player of the first match and allocating at least a portion of the first challenge to the winning player of the first match;

subsequent to the first match, the host device transmits computer-executable instructions to the server to facilitate a second match between the winning player of the first match and a third ranked player of the sorted queue of ranked players, wherein the second match results in a winning player and a losing player, and wherein facilitating the second match includes communicatively coupling devices associated with the winning player of the first match and the third ranked player, communicating the rules and controls via the network as session control information for a session between a device of the winning player of the first match and a device of the third ranked player, and partitioning a second challenge corresponding to the performance rating or the monetary value or both received from the losing player of the second match and allocating at least a portion of the second challenge to the winning player of the second match, wherein at least the portion of the second challenge includes a portion of the first challenge allocated to the winning player of the first match when the winning player of the second match is the third ranked player; and the host device transmits computer-executable instructions to the server to facilitate a final match between the winning player of a preceding match and a highest-ranked player of sorted queue of ranked players, wherein the final match results in a champion player and a losing player, and wherein facilitating the final match includes communicatively coupling devices associated with the winning player of the preceding match and the highest ranked player, communicating the rules and controls via the network as session control information, for a session between a device of the winning player of the preceding match and a device of the highest-ranked player, and partitioning a final challenge corresponding to the performance rating or the monetary value or both received from the losing player of the final match and allocating at least a portion of one or more preceding challenges to a winning player of the final match, wherein at least the portion of the final challenge includes a portion of the one or more preceding challenges allocated to the winning player of the one or more preceding match when the winning player of the final match is the highest-ranked player.

17. The one or more non-transitory computer-readable media of claim 16, wherein the non-transitory computer-readable media further comprise instructions that when executed by a computer system cause the computing system to:

validate each challenge received from the ranked players; and prior to facilitating a match of the matchmaking session, re-rank the one or more of the ranked players based on their validated challenges, wherein re-ranking includes re-classifying one or more of the ranked players with invalid challenges as unranked players.

18. The one or more non-transitory computer-readable media of claim 17, where the account corresponding to each of the plurality of players includes information indicating the performance rating of the corresponding player, wherein the challenge corresponding to each ranked player includes a rating value, and wherein validating each received challenge includes verifying that the rating value of the challenge corresponding each ranked player does not exceed the performance rating corresponding to the ranked player.

19. The one or more non-transitory computer-readable media of claim 16, wherein the account corresponding to each of the plurality of players includes a performance rating, wherein the challenge corresponding to each ranked player includes a rating value, wherein partitioning the challenge received from the losing player of the first match for allocation includes:

decreasing the performance rating corresponding to the losing player of the first match is by the rating value associated with the challenge corresponding to the losing player, increasing the performance rating associated with the winning player of the first match by a first portion of the rating value associated with the challenge corresponding to the losing player of the first match, and reserving a second portion of the rating value associated with the challenge corresponding to the losing player of the first match for the champion player of the final match.

20. The one or more non-transitory computer-readable media of claim 16, wherein the account corresponding to each player of the plurality of players includes information indicating the monetary value available to the account, wherein the challenge corresponding to each ranked player includes at least a portion of the monetary value available to the account, and wherein partitioning the challenge received from the losing player of the first match for allocation includes:

decreasing the monetary value available to the account corresponding to the losing player of the first match by the monetary value associated with the challenge corresponding to the losing player of the first match, increasing the monetary value available to the account corresponding to the winning player of the first match by a first portion of the monetary value associated with the challenge corresponding to the losing player of the first match, reserving a second portion of the monetary value associated with the challenge corresponding to the losing player of the first match for the champion player of the final match, and reserving a third portion of the monetary value associated with the challenge corresponding to the losing player of the first match for an administrator.

* * * * *

UNITED STATES PATENT AND TRADEMARK OFFICE
CERTIFICATE OF CORRECTION

| | |
|---|---|
| PATENT NO. | : 11,571,629 B2 |
| APPLICATION NO. | : 16/986794 |
| DATED | : February 7, 2023 |
| INVENTOR(S) | : Mark Twomey |

It is certified that error appears in the above-identified patent and that said Letters Patent is hereby corrected as shown below:

In the Claims

At Column 21, Claim number 11, Line number 36, delete "thirdranked player" and replace with --third ranked player--.
At Column 22, Claim number 16, Line number 59, delete "wherein a stored player data" and replace with --wherein stored player data--.

Signed and Sealed this
Fourteenth Day of March, 2023

Katherine Kelly Vidal
*Director of the United States Patent and Trademark Office*